United States Patent [19]

Mauterer

[11] Patent Number: 5,512,084
[45] Date of Patent: Apr. 30, 1996

[54] METHOD OF REMOVING ORGANIC CONTAMINANTS

[75] Inventor: David Mauterer, Atlanta, Ga.

[73] Assignee: Contaminant Separations, Inc., New Oxford, Pa.

[21] Appl. No.: 303,317

[22] Filed: Sep. 9, 1994

Related U.S. Application Data

[63] Continuation-in-part of Ser. No. 40,881, Mar. 31, 1993, Pat. No. 5,452,758.

[51] Int. Cl.$^6$ ................................................... B01D 53/14
[52] U.S. Cl. .............................. 95/199; 95/202; 95/228; 95/229; 95/237; 95/257; 95/288
[58] Field of Search .............................. 95/150, 156, 199, 95/200, 202, 204, 206, 210, 214, 228, 229, 231, 237, 257, 258, 288

[56] References Cited

U.S. PATENT DOCUMENTS

| | | | |
|---|---|---|---|
| 2,341,527 | 2/1944 | Chaney | 95/229 X |
| 2,342,838 | 2/1944 | Brunjes | 95/199 |
| 2,598,116 | 5/1952 | Du Bois | 95/199 |
| 2,765,872 | 10/1956 | Hartman et al. | 95/199 |
| 2,852,090 | 9/1958 | Kelley | 95/199 X |
| 3,395,510 | 8/1968 | Barnes | 95/214 X |
| 3,634,998 | 1/1972 | Patterson | 95/231 X |
| 3,746,084 | 7/1973 | Ostbo | 165/163 |
| 4,284,609 | 8/1981 | deVries | 95/228 X |
| 4,364,750 | 12/1982 | Koncz | 95/200 X |
| 4,487,616 | 12/1984 | Grossman | 95/206 |
| 4,690,698 | 9/1987 | Reid | 95/200 |
| 4,932,334 | 6/1990 | Patte et al. | 95/229 X |
| 5,080,696 | 1/1992 | Marchand et al. | 95/229 X |
| 5,171,557 | 12/1992 | Crosbie et al. | 95/210 X |

Primary Examiner—Robert Spitzer

[57] ABSTRACT

A method of removing organic contaminants from a process gas such as raw, untreated landfill gas is disclosed. The steps involve collecting the process gas that includes organic contaminants for removal. An absorption liquid such as a terpene, is injected as a mist into the process gas to form a two-state absorption liquid and process gas fluid. The two-state absorption liquid and gas fluid communicates through a heat exchange module for absorption of organic contaminants in the process gas by the absorption liquid resulting in a cleaned process gas. The absorption liquid then is separated from the cleaned process gas.

11 Claims, 4 Drawing Sheets

METHOD OF REMOVING ORGANIC CONTAMINANTS

RELATED APPLICATION

This application is a continuation-in-part of co-pending patent application Ser. No. 08/040,881, filed Mar. 31, 1993, now U.S. Pat. No. 5,452,758.

TECHNICAL FIELD

The present invention relates to treatment of process gases. More particularly, the present invention relates to an apparatus and method for removing organic contaminants from a process gas.

BACKGROUND OF THE INVENTION

Manufacturing plants that use chemicals often create, use or treat a process fluid. The process fluid typically is a gas or liquid flowing through various pieces of equipment including tanks, pipes, valves, and process equipment, at the manufacturing facility to make a product with the process fluid. Other manufacturing plants and facilities generate fluids as a by-product of the manufacturing process. Sometimes this by-product fluid has commercial value in and of itself, but often by-products are wasted to disposal sites. Prior to recovery and reuse of the process fluids, however, contaminants must be removed from the process fluid. Contaminants decrease the value of the process fluid, decrease its effectiveness, or otherwise interfere with its use either as a process fluid or for other uses as a by-product.

Landfills are one example of facilities that generate gas having commercial benefits. Landfills create methane gas as a by-product of disposal of waste. Previously, methane gas was allowed to vent freely to the atmosphere. Recently, however, efforts have been made to collect and use such gas. These efforts are made due in part to the economic value of the recovered methane gas and also to environmental purposes for improving air and water quality.

Various types of apparatus and equipment have been used for removing contaminants from process fluids. Scrubbers in various forms are often used to treat process fluids. Scrubbers include vertical scrubbers which pass the process fluid through filters which catch and hold the contaminants. Vertical scrubbers typically are counterflow in that the process fluid flows in one direction and the removed contaminants flow in an opposite or transverse direction. Other scrubbers are centrifugal and cyclonic separators. These devices induce spinning currents to the process fluid to separate contaminants from the useful process fluid.

Scrubbers and other devices for treating process fluids often use large quantities of absorbent fluids. The absorbent fluids are added to the process fluid for absorbing contaminants. Typically absorbent fluids are solvent which are relatively volatile. Federal government requirements, however, set standards for use and release of such materials, for the purpose of improving the quality of air and water. Special handling, controls, monitoring, and reporting on the solvents are often required.

Significant quantities of absorbent fluid are often typically used in treating a process fluid. Typically, the ratio of absorbent fluid to process fluid is 1:1 or higher. Often the weight of the solvent exceeds the weight of the process fluid to be treated. Such solvents incur other problems during disposal. Solvents are difficult to handle, use, store, and dispose with security in a waste facility.

One type of scrubber removes contaminants by means of physically contacting the process fluid with a solvent, typically in a compact heat transfer apparatus known as a heat exchanger. Heat exchangers include a plurality of heat transfer surfaces for exposing the heated process fluid to the absorption fluid which is usually chilled for improved solubility/absorption capacity. Compact heat exchangers are generally characterized as having extended surfaces for transfer of heat. The most common configurations are known in the industry as either a plate-fin or a tube-fin type of surface. The fins provide significantly large surface area-to-volume ratios to facilitate heat transfer. Although both types of heat exchangers function to extract heat from the process fluid, the types have significant differences. Of the two types, plate-fin devices typically exhibit a significantly higher ratio of heat transfer surface to volume of heat exchanger. The process fluid flowing through the heat exchanger typically is in relatively controlled flow against the heat transfer surfaces. The process fluid is divided into channels defined by the closely spaced separator plates such that specific flow regimes or flow patterns are created at the heat transfer surface with minimal eddy currents. The liquid film thickness on the plates and fins is minimized. Such flow enhances the transfer of heat from the process fluid to the refrigerant.

Tube-fin type heat exchangers in contrast typically exhibit relatively uncontrolled flow in the process fluid. This turbulence is in the form of uncontrolled cross-flow from one tube surface to an adjacent tube surface. The turbulent flow is imposed by the shape, spacing, and the relatively off-set relationship of the tubes that carry the refrigerant fluid. The resulting flow and non-uniform film boundary on the tubes and fins impedes transfer of heat from the process fluid to the refrigerant.

Typically, either type is used in a single stage heat exchanger designed for the specific cooling requirements. The heat exchanger provides the plurality of tubes or plates through which the refrigerant fluid flows. The refrigerant may be returned across the flow path of the process gas typically once or perhaps twice. The number of plates or tubes depend on the cooling capacity required.

Heat exchangers typically comprise a housing having a process fluid inlet and a process fluid outlet. The process fluid typically flows in a cross-direction to the refrigerant flow through the plates or tubes. A heat exchanger having two or more sections, or stages, of stacked plate or tube elements has been described previously. For example, U.S. Pat. No. 3,746,084 describes a housing that encloses several sections of stacked refrigerant pipes. Each section includes a separate input and output header for the refrigerant supplied to that section. This heat exchanger, however, does not provide a rigorous flow path for the process fluid. The header is exposed to the process fluid.

While functioning to extract heat from the process fluid, the heat exchanger has several drawbacks. Nonuniformity of heat extraction leads to purity problems of the resulting cooled process fluid. Heat exchangers particularly are used in condensers which extract waste liquid and contaminants and thereby purify the process fluid. The nonuniformity of the thermal transfer and the unrigorous flow path for the process fluid results in process fluid moving through the heat exchanger without being treated, e.g., some fluid does not contact enough transfer surface to effect cooling and absorption. Untreated process fluid retains the contaminants and thus the purity of the resulting process fluid is not as great. For example, methane gas typically emits from a land fill. The gas is generated by decaying debris placed in the landfill. The methane gas further contains contaminants that are emitted by the decaying materials. These contaminants include chlorinated hydrocarbons, aromatics, and organic silicon compounds, among others. The heat exchanger cools the methane gas to condense water from the gas. The contaminants condense and are absorbed into the water. The water drains from the heat exchanger to a collector. A separator may be used to divide the contaminants for separate collection.

Accordingly, there is a need in the art for an improved method of removing contaminants from a process gas.

SUMMARY OF THE INVENTION

The present invention overcomes the problems of the prior art by providing a method of removing organic contaminants in a process gas. A process gas that contains organic contaminants is collected. An absorption liquid is injected into the process gas to form a two-state absorption liquid and process gas fluid. In a preferred embodiment, the absorption liquid is a terpene, which preferably is injected as a mist into the process gas in a ratio of about 1:10 to 1:100 absorption liquid to process gas by weight. The absorption liquid and gas form a two-state fluid which is communicated through a heat exchange module. The two-state fluid is cooled and the organic contaminants are absorbed by the absorption liquid. This results in a cleaned process gas. The absorption liquid with the organic contaminants is then separated from the cleaned process gas.

In a preferred embodiment the organic contaminants are absorbed by the absorption liquid while the two-state fluid is communicated along a flow path defined by spaced-apart channels disposed transverse to the flow path in at least two heat exchange modules stacked together. A refrigerant communicates through the channels with the refrigerant in one heat exchange module flowing in a first direction and the refrigerant in the adjacent heat exchange module flowing in a second opposite direction.

A preferred method employs a two-stage absorption in which contaminants are initially absorbed from the process gas by communicating the process gas through a set of heat exchange modules. The refrigerant in this set of heat exchange modules comprises the cleaned process gas resulting from the use of the absorption fluid.

Objects, advantages and features of the present invention will become apparent from a reading of the following detailed description of the invention and claims in view of the appended drawings.

DETAILED DESCRIPTION OF THE PREFERRED EMBODIMENT

Figure 1:
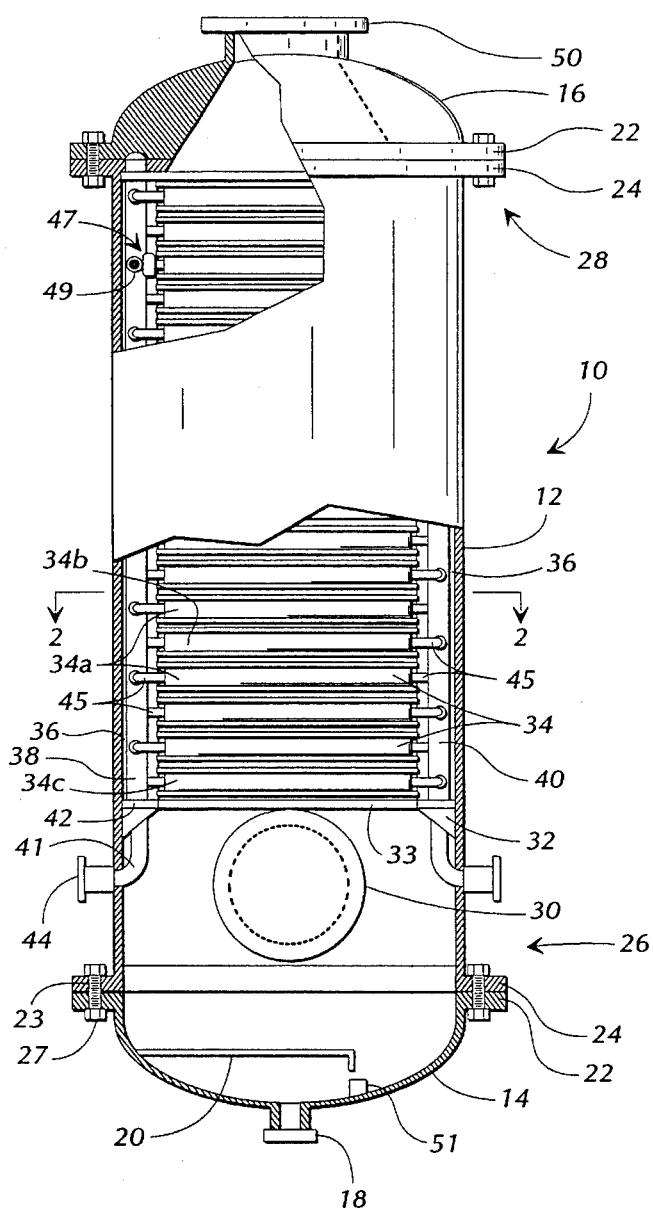
FIG. 1 is a cut-away side elevational view of a preferred embodiment of a heat exchanger for a process fluid.

Referring now in more detail to the drawing, in which like numerals indicate like parts throughout the several views, FIG. 1 illustrates a partially cut-away side elevational view of a preferred embodiment of a heat exchanger 10 for extracting heat from a fluid. The heat exchanger 10 comprises a vessel made of a cylindrical shell 12 closed by end caps 14 and 16. The vessel preferably is pressure and vacuum rated. The end caps 14 and 16 can be elliptical, ASME, or dished-head configuration. As illustrated, the end caps 14 and 16 have a gradually reducing taper. The end cap 14 comprises a collector for receiving condensate from the heat exchanger 10. The end cap 14 includes an axially-disposed drain and coupling 18 for communicating condensate from the end cap 14 to a condensate discharge from the apparatus that includes the heat exchanger 10. In the illustrated embodiment, a baffle or separator 20 attaches to the interior of the end cap 14. The collection and separation functions that the end cap 14 performs are well known in the industry. An annular flange 22 extends outwardly around the perimeter of an open end of the cap 14. The flange 22 includes a plurality of spaced-apart bores (not illustrated) for receiving bolts 23, as discussed below, for securing the caps 14 and 16 to the shell 12.

An annular flange 24 extends outwardly at each of a lower end 26 and an upper end 28 of the shell 12. The flanges 22 have a plurality of bores, each for receiving one of the bolts 23 therethrough. The end caps 14 and 16 align with the shell 12. The bolts 23 pass through the bores in the flanges 22 and 24 and receive nuts 27 to rigidly connect the end caps 14 and 16 to the shell 12.

A nozzle 30 connects to a bore in the shell 12 for an inlet for the process fluid into the shell. The nozzle 30 connects to a supply of process fluid to be passed through the heat exchanger 10. The end cap 16 includes a nozzle 50 for communicating a process fluid from the heat exchanger 10.

An annular flange 32 mounts to the interior wall of the shell 12 in the lower end 26. The flange 32 supports a plate 33, discussed below. The plate 33 and the flange 32 support a plurality of heat exchange modules 34 stacked together in a column. The plate 33 connects to the lowermost heat exchanger 34c, as discussed below.

Figure 2:
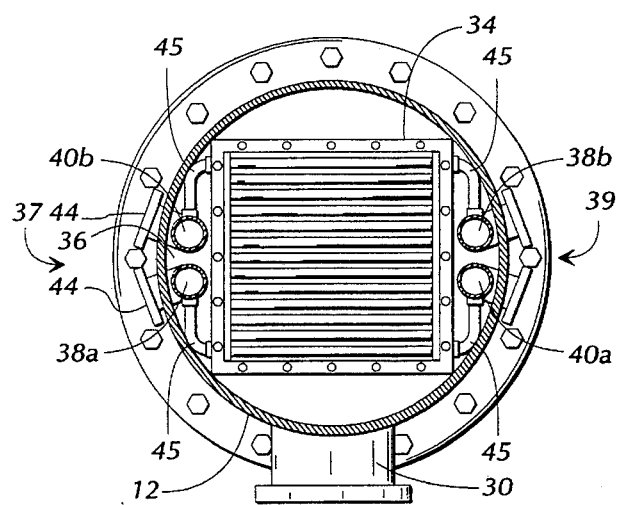
FIG. 2 is a top plan view of the heat exchanger taken along lines 2—2 of FIG. 1.

The column of heat exchange modules 34 define a plurality of annular cavities 36 between the sides of the modules and the interior wall of the shell 12. The annular cavities 36 hold two pairs of a supply header 38 and a discharge header 40. FIG. 2 illustrates a preferred arrangement of the headers 38 and 40 in the cavities 36 on a first side 37 and an opposite side 39 of the shell 12. In an alternate embodiment, not illustrated, the headers 38 and 40 are spaced-apart on a radius on the opposite sides of the shell 12. The supply headers 38 communicate refrigerant fluid from a supply (not illustrated) to the heat exchange modules 34. The discharge headers 40 receive the refrigerant fluid from the heat exchange modules 34 for return to the supply.

The headers 38 and 40 are elongate pipes that extend through bores (discussed below) in the plate 33. A lower end 42 of each header 38 and 40 connect to a respective tube 41 which is received by a flange 44 in the sidewall of the shell 12. The headers 38 and 40 communicate with a supply (not illustrated) of a refrigerant fluid. A preferred embodiment provides a threaded connector at the lower end 42 which couples with the flexible tube 41 to the flange 44. As best illustrated in FIG. 2, the supply header 38a on the first side 37 of the shell 12 communicates with the discharge header 40a on the opposite second side 39 of the shell 12, as discussed below. In an alternate embodiment, the supply header 38a is on the same side of the shell 12 as is the discharge header 40a.

The supply header 38 and the discharge header 40 communicate with the heat exchange modules 34 through connection hoses 45. One supply header 38a communicates with a first group of heat exchange modules 34a. The second supply header 38b communicates with a second group of heat exchange modules 34b. The modules 34 are disposed in alternating sequence in the column, such that one of the modules 34a in the first group is adjacent one of the modules 34b in the second group. The inlets of each heat exchange module 34 (discussed below) are disposed on alternating sides of the shell 12. The refrigerant fluid flows in a first direction through the modules 34a of the first group and flows in a second opposite direction through the modules 34b of the second group.

An alternate embodiment of the present invention includes a flow meter 47 and a valve 49 on each connection hose 45 between the supply header 38 and the heat exchange module 34. For convenience, FIG. 1 illustrates the flow meter 47 and the valve 49 on one of the connection hoses 45. The flow meters communicate with a controller, such as a microprocessor, to monitor refrigerant flow through the respective heat exchange modules 34. If the flow rate for a module 34 is excessive, the valve 49 can be closed to shut off fluid flow through the heat exchange module. Excessive flow would indicate a leak or other problem with the heat exchange module. Closing the valve 49 permits the heat exchanger 10 to continue operating, until such time as the process can be stopped and repairs made to the particular heat exchange module.

In an alternate embodiment, a sensor 51 is fixed to a lower portion of the end cap 14. The sensor monitors the condensate. Upon detecting the presence of the refrigerant fluid in the condensate, a signal can be sent to indicate a leak in the heat exchanger.

Figure 3:
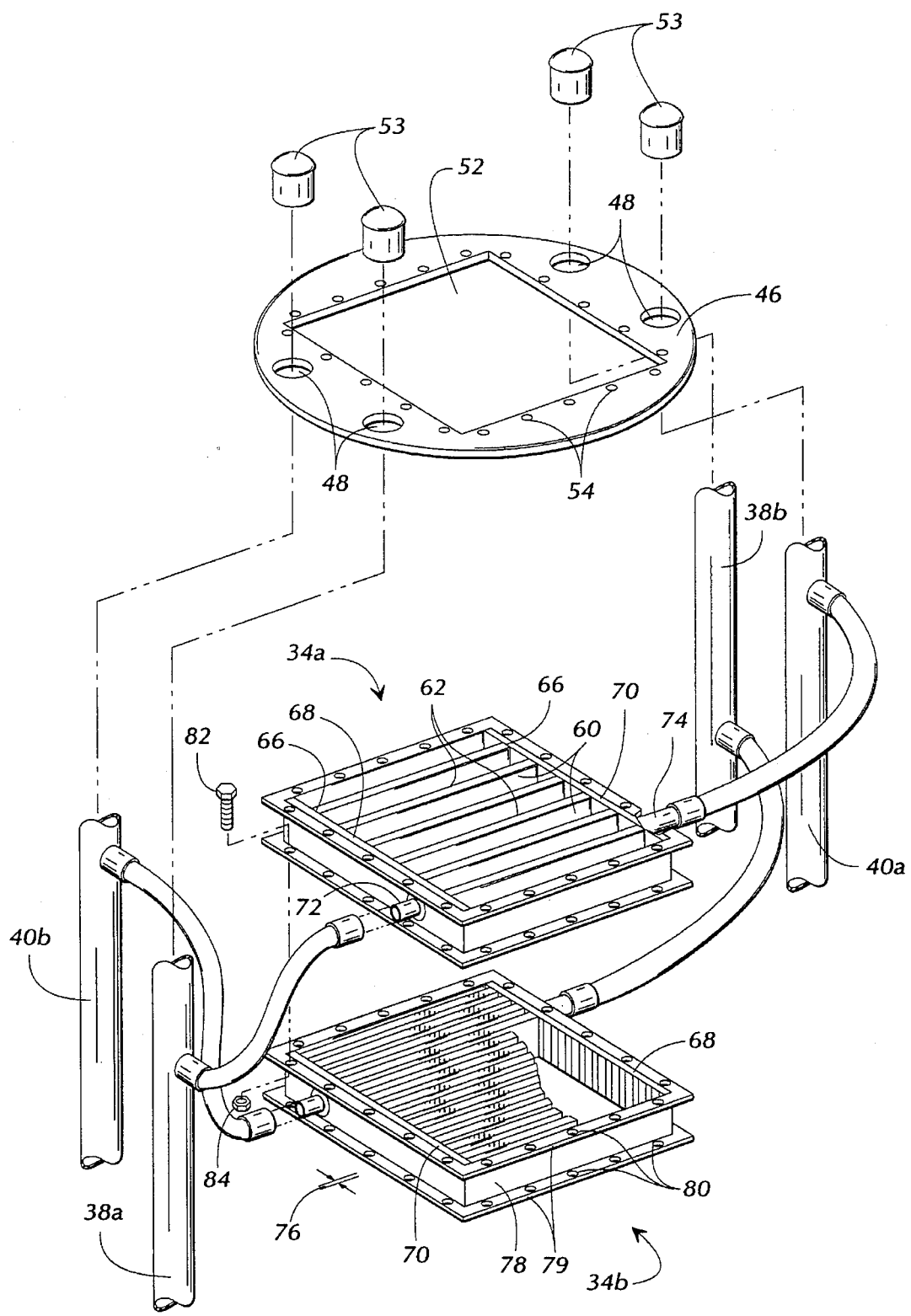
FIG. 3 is an exploded perspective view of the heat exchange module for the heat exchanger illustrated in FIG. 1.

The plate 33 and a plate 46 close the lower end 26 and the upper end 28, respectively, of the shell 12. The plate 33 is identical in structure to the plate 46, and the following description of the plate 46 applies to the plate 33. FIG. 3 illustrates the upper plate 46 exploded from a pair of the modules 34a and 34b. The plate 46 includes a plurality of bores 48. Each bore 48 axially aligns with a respective one of the supply headers 38 and discharge headers 40. The bores 48 in the upper plate 46 are sized so that the headers 38 and 40 press-fit through the bores. The upper ends of the headers 38 and 40 are closed by a respective cap 53. A sealing material inserts in the bores 48 against the headers 38 and 40 to restrict passage of the process fluid into the annular cavities 36. The sealing material also inserts around the periphery of the plates 33 and 46 against the inner wall of the shell 12.

The plate 46 defines an opening 52 that corresponds in shape to the cross-section of the heat exchange modules 34. A plurality of bores 54 are disposed around the periphery of the opening 52. The bores 54 receive bolts for securing the plate 46 to the adjacent heat exchange module 34, as discussed below. The plate 33 similarly bolts to the heat exchange module 34 adjacent to it. The lower ends of the headers 38 and 40 extend through the bores 48 in the plate 33 for connection through the holes 41 to the respective coupler 44.

FIG. 3 further illustrates a perspective view of a pair of modules 34a and 34b exploded from the upper plate 46. The modules 34 are of plate-fin construction that are of brazed manufacture. The modules 34 are preferably rectangular. Each module 34 has plurality of pairs of spaced-apart thin plates 60 which are closed on the upper and lower (not illustrated) longitudinal edges 62 to define a channel for communicating the refrigerant fluid. The longitudinal ends 66 open into an intake manifold 68 and a discharge manifold 70. An inlet tube 72 connects to the intake manifold 68. A discharge tube 74 connects to the discharge manifold 70. The inlet tube 72 and the discharge tube 74 receive the respective connection hose 45 for communicating refrigerant fluid through the heat exchange module 34. In an alternate embodiment (not illustrated) the heat exchange modules 34 provide multiplane, multipass refrigerant flow through the plates.

The pairs of plates 60 are spaced-apart to define a gap 76 between adjacent pairs, with the spacing of the plates in the module 34a grossly exaggerated for illustration purposes. The plurality of gaps 76 define a rigorous flow path through the heat exchange module 34. A separate fin (not illustrated) may be disposed in the gaps 76 to increase the surface area for thermal transfer. The column of heat exchange modules 34 provide a rigorous flow path through the heat exchanger 10 for the process fluid.

A U-shaped channel 78 attaches around the perimeter of each of the heat exchange modules 34. The channel 78 provides rigidity to the heat exchange module 34 and facilitates connecting adjacent modules together. The U-shaped channel 78 provides a pair of parallel flanges 79 that extend outwardly from the heat exchange module 34. Each flange 79 includes a plurality of spaced-apart bores 80. Each bore 80 receives a bolt 82 and a nut 84 for rigidly connecting together the adjacent heat exchange modules 34a and 34b. Similarly, bolts 82 extend through the bores in the plates 33 and 46 for rigidly connecting the respective plate to the lowermost and uppermost heat exchange modules 34 in the column. The plates 33 and 46, together with the firmly held headers 38 and 40, define a frame for holding the column of heat exchange modules 34. The frame and the bolt connections between adjacent heat exchange modules 34 allow easy removal of a selected module, for repair or replacement as necessary.

A seal (not illustrated) preferably inserts between the flanges 79 of adjacent heat exchange modules 34. The seal reduces the opportunity for fluid leaks between adjacent modules and thereby maintains the rigorous flow path for the process fluid through the column of modules. The seal preferably is a thin metal ribbon or a ribbon of polytetrafluoroethylene.

In operation, the heat exchanger 10 receives a process fluid through the inlet nozzle 30. The process fluid moves upwardly through the flow path defined by the column of heat exchange modules 34. It is to be appreciated by one of ordinary skill that the process fluid could also flow downwardly through the column and could flow laterally, depending on the orientation of the heat exchanger 10. The flange 32 and the lower plate 33 direct the process fluid into the heat exchange modules 34 through the opening 52 in the plate 33. The flow of the process fluid across the plates 60 is laminar in the gaps 76 between the plates. To be more specific, a liquid or gas film is established from the inlet to the exit thus avoiding undesirable cross-flow turbulence within a given channel of the plate-fin unit. This "laminar flow" within a channel enhances local and overall heat transfer by allowing controlled conduction across the fluid film on the plate.

The refrigerant fluid flows through the pairs of plates 60 in a cross-direction to the flow of the process fluid. The process fluid contacts the plates 60 which are chilled by the refrigerant fluid. The contact transfers heat from the process fluid to the refrigerant fluid as the process fluid flows through the column of heat exchange modules 34.

Each heat exchange module 34 receives refrigerant fluid in parallel from the supply header 38. In the illustrated embodiment, two supply headers 38a and 38b feed two groups of modules 34a and 34b respectively. The modules 34 are disposed so that the inlet tubes 72 for the first group of modules 34a are on the first side 37 of the shell 12 and the inlet tubes 72 for the second group of modules 34b are on the opposite second side 39 of the shell 12. The refrigerant fluid flows in the first direction through the modules 34a and flows in the second opposite direction through the modules 34b.

The parallel feed and the alternating direction of refrigerant feed to the modules 34 facilitates increased uniformity of thermal transfer between the fluids. The process fluid is uniformly cooled across the heat exchange modules for each pair of modules 34a and 34b. The present invention therefore provides substantially uniform cooling of the process fluid as it flows through the column of heat exchange modules.

For example, in one of the modules 34a the refrigerant fluid flows in a first direction from the first side 37 to the opposite second side 39. The process fluid on the first side 37 contacts a portion of the plates 60 that are colder than the portions of the plates on the second side 39. The first side 37 in the module 34a has potential for more thermal transfer than the second side 39. In the adjacent heat exchange module 34b, the refrigerant enters on the second side 39 and exits on the first side 37. The process fluid flowing through the module 34b on the second side 39 thereby contacts portions of the plates 60 which are colder than the portions on the first side 37. However, after the process fluid has passed through the two adjacent heat exchange modules 34a and 34b, the temperature difference in the process fluid across the cross-section of the heat exchange modules 34 is substantially uniform.

Substantial uniformity of temperature difference in the process fluid promotes uniform condensation of contaminants from the process fluid. Laminar flow through the column (with defined turbulence in the column) increases the overall efficiency of heat transfer. Fewer heat exchange modules are therefore necessary to effect a given temperature change for a process fluid. Fewer heat transfer modules decreases the pressure drop of the process fluid flowing through the heat exchanger. Communicating refrigerant fluid in parallel to the heat exchange modules results in a relatively small change in temperature for the refrigerant fluid. These advantages provided by the present invention further reduce the operating cost and the capital cost of the heat exchanger.

The example discussed below illustrates the design of a heat exchanger 10 according to the present invention. The process fluid is methane gas, such as would be emitted by a landfill. The heat exchanger 10 produces a purified methane gas. The methane gas includes water vapor and contaminants. Each heat exchange module reduces the temperature of the methane gas and condenses some water vapor from the methane gas. The condensate absorbs the contaminants, thereby holding them in the water solution. The condensate drains down the plates 60 to the end cap 14 for separation and discharge through the drain 18.

In this example, the refrigeration fluid is 10% glycol. The heat exchange modules 34 are ten-plate units model 1E2629 manufactured by Modine Manufacturing Company, Racine, Wis. The modules are rectangular and have an approximate cross-sectional area of 1.66 square feet. During the design, computations are made to determine the change in temperature for the methane gas that flows through the plurality of the heat exchange modules 34. The modules will then be stacked in a column according to the present invention, whereby the first group of modules 34a communicate in parallel with the supply header 38a and the discharge header 40a. The second group of modules 34b communicate with the supply header 38b and the discharge header 40b. The modules 34a and 34b alternate in the column.

The fluid rate of the refrigerant is determined to be 12,510 pounds per hour, as determined below:

$$M = 25 \text{ gallons per minute} \times 60 \text{ minutes per hour} \times 8.34 \text{ pounds per gallon}$$
$$= 12{,}510 \text{ pounds per hour}$$

The 25 gpm is based on the manufacturers minimum recommended flow rate per plate to achieve good laminar flow. Such information is typically provided in graph form by the manufacturer of the module.

The initial temperature of the methane gas entering the first module is 75° F. The temperature of the glycol refrigerant fluid is 34° F. The methane gas cools as it passes through the module 34. The cooled process gas exits one heat exchange module 34a and immediately enters the adjacent heat exchange module 34b for continued cooling. The condensate absorbs contaminants for purifying the methane gas.

The method described below determines the change in temperature for the process fluid in the heat exchange module 34. First, the temperature of the process fluid exiting the heat exchange module ($T_0$) is computed. The value $T_0$ equals the temperature of the process fluid entering the module ($T_i$) minus the change in temperature ($\Delta T_p$). The change in temperature $\Delta T_p$ is estimated. The estimate of $\Delta T_p$ may have to be changed after the computations are made for the particular module. It is necessary to change the estimate and recompute because a particular estimated change in temperature may mathematically indicate that a greater mass of water is condensed than could actually be achieved. Also, the estimate may need to be changed if the computations indicated less mass of water is condensed than would be actually achieved.

Second, the water content of the process fluid exiting the module is then determined. The amount of water condensed in the particular heat exchange module equals the difference between water content of the process fluid entering the heat exchange module and the water content of the process fluid exiting the heat exchange module. The amount of water in the process fluid exiting the heat exchange module equals the water content at $T_0$ times the dry gas amount. For methane gas, the dry gas amount was assumed to be close to that of air, or 0.016 pounds of water per pound of gas. It may be appreciated that the water content exiting a particular heat exchange module equals the water content of the process fluid entering the next adjacent heat exchange module.

Third, the amount of water condensed ($M_c$) is used in a formula below to balance the known total heat gain with the sensible heat and the latent heat. Solving the formula results in a computed value ($\Delta T_c$) for the change in temperature of the process fluid. The computed value is used to verify the estimated change in temperature $\Delta T_p$. In this formula, the heat exchange rate Q' equals the sensible heat lost plus the latent heat. In other words, the heat exchange rate equals the total dry process fluid times the specific heat of the refrigerant fluid at an average module temperature times the change in temperature $\Delta T_c$ plus the heat of vaporization measured at an average temperature for the module times the amount of water condensed in the module. The formula is balanced to determine $\Delta T_c$.

$$Q'=[M_p \times C_p^\circ \times \Delta T_c]+[\Delta H_v \times M_c]$$

If the computed change in temperature $\Delta T_c$ from the formula equals the estimated $\Delta T_p$, then the computations for the particular module are finished. The temperature of the process fluid exiting the module is known, and this becomes the temperature of the process fluid entering the adjacent module.

If the computed change in temperature exceeds the estimated $\Delta T_p$, then the estimated change in temperature $\Delta T_p$ must be increased and the amount of water condensed in the heat exchange module recomputed. This is because the computations using that particular estimated change in temperature $\Delta T_p$ are based on condensing a greater amount of water than could actually be extracted by the module as the process fluid flows through.

If the computed change in temperature is less than the estimated $\Delta T_p$, then the estimated change in temperature $\Delta T_p$ must be lowered because a smaller amount of water was computed as being condensed than actually would be extracted from the process fluid.

This method described above is repeated for an additional heat exchange module until the exit temperature of the process fluid in the module reaches or exceeds the target temperature. The modules are stacked in sequence with the inlet tube 72 alternating on the first side and the second side of the shell 12. The modules 34a having the inlet tubes 72 on a first side of the shell 12 connect in parallel to the supply header 38a. The discharge tube 74 from these modules 34a connect in parallel to the discharge header 40a. Similarly, the alternating group of modules 34b connect in parallel to the supply header 38b on the second side of the shell 12. The discharge tubes of the modules 34b connect in parallel to the discharge header 40b.

The table below lists the rate of change Q' in heat for the methane gas which enters a module n in the column of modules, where n is the sequence number of the module in the column. The rate of change in heat Q' is in terms of BTU per minute. The change in the temperature of the process fluid $\Delta T_p$ is listed in ° F. The sum of the change in temperature $\epsilon \Delta T_p$ shows the change in the temperature in ° F. as the process fluid flows through the column.

| Module | Q' | $\Delta T_p$ | $\Sigma \Delta T_p$ |
|---|---|---|---|
| 1 | 328 | 5 | 5 |
| 2 | 288 | 4.7 | 9.7 |
| 3 | 250.4 | 4.5 | 14.2 |
| 4 | 214.4 | 4.15 | 18.35 |
| 5 | 181.2 | 3.75 | 22.1 |
| 6 | 151.2 | 3.3 | 25.4 |
| 7 | 124.8 | 2.85 | 28.25 |
| 8 | 102.0 | 2.4 | 30.65 |
| 9 | 82.8 | 2.0 | 32.65 |
| 10 | 66.8 | 1.69 | 34.34 |
| 11 | 58.6 | 1.35 | 35.69 |
| 12 | 42.8 | 1.11 | 36.8 |
| 13 | 34.0 | 0.9 | 37.7 |
| 14 | 26.5 | 0.7 | 38.4 |
| 15 | 26.2 | 0.55 | 38.95 |

The above method has designed a 15 module heat exchanger 10 for cooling methane gas from 75° to approximately 36° F. Condensate driven from the methane gas absorbs contaminants and the contaminants in the condensate are removed through the drain 18 of the heat exchanger for disposal. The purified methane gas exits the heat exchanger 10 through the coupler 50 for subsequent processing.

The foregoing disclosure has described a preferred embodiment of an apparatus and method for transferring thermal energy from a process fluid to a refrigerant fluid. The disclosed embodiment accordingly cools the process gas that moves through the flow path between the plates 60. The apparatus could also function as a heater. In this alternate embodiment, the process fluid and the refrigerant fluid are switched. The process fluid flows through the channels defined by the pairs of plates 60. The refrigerant fluid flows through the gaps 74 in the modules 34. An example is an oil fluid heater. The first fluid, or the process fluid, is an oil. The oil circulates from a supply across a heating element and through the heat exchange modules. The second fluid is a gas, air for example, which flows through the gaps between the plates of the heat exchange module. The apparatus and method of the present invention accordingly is either a chiller or a heater for transferring thermal energy between a first fluid and a second fluid.

Figure 4:
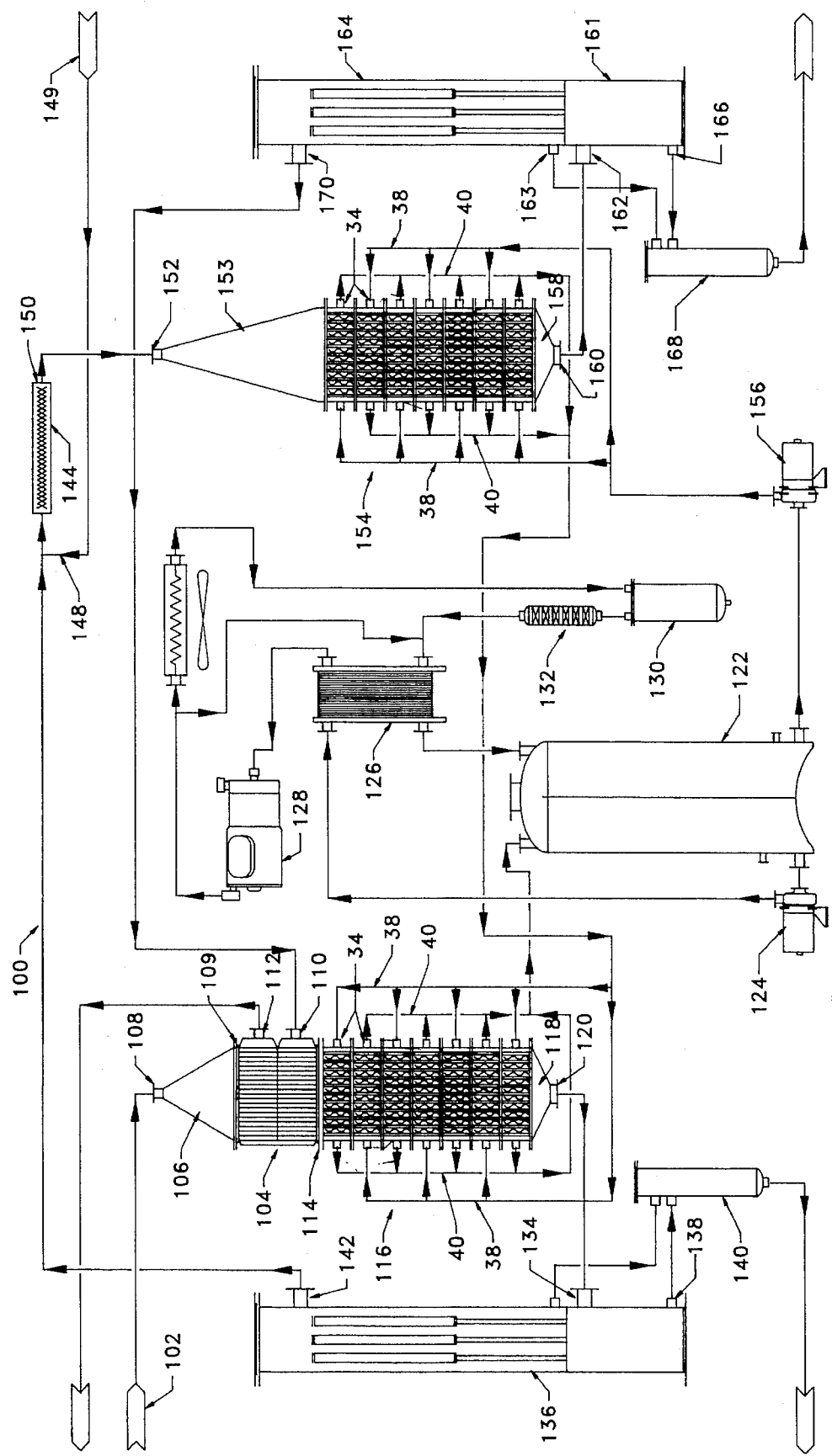
FIG. 4 is a schematic drawing of apparatus for removing organic contaminants in a process gas.

FIG. 4 is a schematic drawing of an apparatus 100 for removing organic contaminants from a process gas. The apparatus 100 includes a conventional collector generally designated 102 which receives and prepares the process gas for removal of organic contaminants. A first stage intercooler 104 includes a conical end cap 106 for communicating the process gas from an inlet 108 through an outlet 109 that connects to the intercooler. The intercooler 104 has a coolant inlet 110 and a coolant outlet 112. The intercooler 104 is of conventional flow-through plate-fin design. In the illustrated embodiment, the intercooler includes appropriate fin-stock surface elements for condensing water vapor in the process gas.

A discharge end 114 of the intercooler 104 connects to an inlet of a first stage heat exchanger 116 constructed in accordance with the heat exchanger 10 described above. The first stage heat exchanger 116 consists of an appropriate number of liquid-cooled braised-aluminum plate-fin type exchange modules 34 for cooling the process gas as discussed above from an inlet temperature to an outlet temperature. The modules 34 are stacked and bolted together.

In the illustrated embodiment, the heat exchanger 116 comprises seven modules 34. The first stage heat exchanger 116 includes an end cap 118 with a drain 120. The end cap 118 connects to a lower end of the stack of heat exchange modules 34. As described above with respect to FIGS. 1 and 2, the heat exchange modules 34 in the heat exchanger 116 connect to supply headers 38 and discharge headers 40. The headers 38 and 40 communicate with a tank 122 holding refrigerant. A refrigerant recirculation pump 124 communicates coolant from the supply 122 through an evaporator chiller 126 and compressor 128. A conventional accumulator 130 and dryer 132 in the evaporation line filter the coolant and absorb water to keep the coolant clean.

The drain 120 connects to an inlet 134 of a first stage liquid separator 136. The separator 136 is a conventional cartridge-type liquid coalescing unit which effects the coalescing and subsequent removal of liquid microdroplets larger than about 0.1 micron. A drain 138 at a lower end is an outlet from the separator 136 for condensed liquid, or condensate. The drain 138 is preferably a float-operated drain valve at the bottom of the separator 136. The drain 138 connects to a condensate trap 140 for collection and discharge of the separated condensate of the fluid flow from the first stage heat exchanger 116.

A gas outlet 142 at an upper end of the liquid separator 136 communicates with an in-line gas-liquid static mixer 144 that includes a posi-displacement metering pump 148. The pump 148 communicates with a source 149 of an absorption fluid that absorbs organic contaminants in the process gas. An outlet 150 of the static mixer 144 connects to an inlet 152 of the second stage heat exchanger 154. The heat exchanger 154 comprises a stack of heat exchange modules 34, as discussed above with respect to the heat exchanger 10. The heat exchange modules 34 connect in parallel to supply headers 38 and discharge headers 40 for communicating a refrigerant from the supply 122 through the heat exchanger 154.

The headers 38 in the heat exchanger 154 connect to a coolant supply pump 156 which receives coolant from the supply 122. In the illustrated embodiment, the discharge headers 40 in the heat exchange module 154 connect to the coolant supply headers 38 in the first stage heat exchanger 116. An end cap 158 connects to a drain 160 in a lower portion of the second stage heat exchanger 154. The drain 160 connects to an inlet 162 of a second stage liquid coalescer 164. This preferably is a high efficiency cartridge-type liquid coalescing device for coalescing liquid mist greater than about 0.1 micron. An outlet 166 of the coalescer 164 connects to a condensate trap 168 for collection of liquid condensate from the fluid flow from the second stage heat exchanger 154 as separated by the coalescer 146. The outlet 166 is preferably a float trap valve. A gas outlet 170 at an upper end of the coalescer 164 communicates with the inlet 110 of the intercooler 104.

Figure 5:
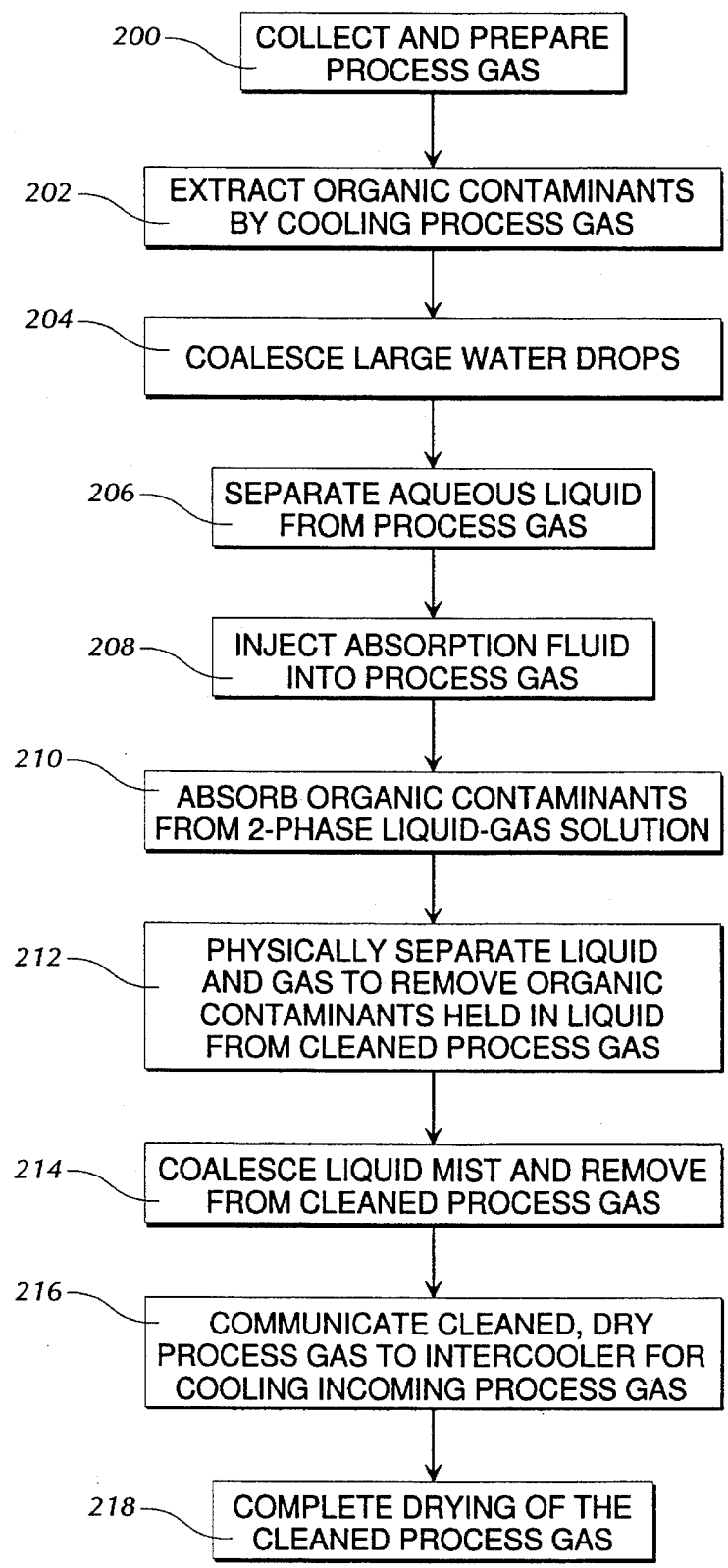
FIG. 5 is a flow chart illustrating the steps of a method for removing organic contaminants in a process gas.

The operation of the apparatus 100 is described with reference to FIGS. 4 and 5. FIG. 5 is a flow chart illustrating the steps of a method for removing organic contaminants in a process gas such as raw, untreated landfill gas saturated with water vapor and containing hydrocarbon organic contaminants. Typically, the hydrocarbon organic contaminants are found in such methane process gas in concentrations ranging from about 20 parts per million volume to 2000 parts per million volume. Such process gas is typically vented from landfills containing wastes identified as a Class 3 domestic municipal solid waste. Concentrations of contaminants are higher for industrial waste that are typically known as Class 1.

The process gas is collected 200 and prepared for removal of organic contaminants in the collector generally designated 102. Raw untreated landfill gas typically is collected at about 90° to 110° F. A compressor compresses the process gas to pressure in a range of about 30 psi to 200 psi. The compressed process gas is then cooled in a gas cooler from about 200° F. to about 90° to 120° F. At this step, some portion of the water vapor in the process gas is condensed and separated using conventional apparatus.

In the illustrated embodiment, the compressed process gas is then communicated to a hydrogen sulfide separation unit as part of the collection and preparation step. The hydrogen sulfide in the methane process gas, is selectively adsorbed adiabatically. In a preferred embodiment, the gas stream frictional pressure drop is limited to about 10 psi and the temperature change is nominal.

The process gas is then passed through a conventional particulate filtration unit to effect removal of particulate matter larger than 0.1 microns.

The process gas is then prepared for removal of organic contaminants. The process gas is communicated 202 through the inlet 108 of the gas intercooler 104 for cooling to a range of between 50° to 80° F. Water vapor is condensed on the fin-plates as the bulk gas is cooled and thereby absorbs organic contaminants in the process gas. This forms an aqueous solution flowing concurrently with the process gas vertically downward through the intercooler 104 and into the heat exchanger 116. The aqueous solution and the process gas thereby form a two-phase fluid flow which exits the discharge 114 of the intercooler 104 and enters the upper modules 34 of the first stage heat exchanger 116.

The process gas and the aqueous solution flow downward through the heat exchange module 116. The refrigerant flowing from the supply headers 38 to the discharge headers 40 condense additional water vapor from the process gas. The water vapor is condensed substantially transversely uniformly across the heat exchanger as the process gas and condensed water flow downwardly through the heat exchangers 116. Additional quantities of the organic contaminants in the process are absorbed into the liquid stream. Vapor contaminants are also condensed into the liquid stream as the two-phase fluid is cooled progressively from one module 34 to the adjacent module 34 as discussed above. In the illustrated embodiment, the two-phase fluid exits the heat exchange 116 through the drain 120 at about 32.5° F. The frictional pressure drop is preferably limited to about 3 psi through the heat exchanger module 116. Approximately 90 to 98 percent of the water in the process gas is condensed and 90 to 95 percent of the organic contaminants in the process gas are condensed or absorbed into the water solution.

The two-phase process gas and liquid mixture then flow through the drain 120 to the separator 136 for separation 204. The separator 136 coalesces the liquid which falls to the bottom 206. The collected liquid drains through the discharge 138 to the condensate trap 140 for collection and subsequent disposal. In a preferred embodiment, the frictional pressure drop in the separator 136 is limited to between about 2 and 4 psi. The process gas now is partially cleaned of contaminants and water vapor. The partially cleaned process gas exits the separator 136 at approximately 33° F. through the discharge 142.

The partially cleaned process gas is routed to the second stage in-line gas-liquid static mixer 144. An absorption fluid is injected 208 through the posi-displacement metering pump 148 into the process gas upstream of the static mixer 144. The apparatus 100 performing the process disclosed herein uses significantly reduced quantities of absorption solvents. The metering pump 148 injects an absorption solvent into the process gas in ratios of between 1:10 to 1:100 absorption solvent to process gas by weight. In a preferred embodiment, the absorption fluid is first chilled to approximately 33° F. In a preferred embodiment, the absorption fluid is a solution of terpenes. The absorption fluid is injected into the process gas at about a 1:10 ratio by weight of absorption fluid to process gas. The static mixer 144 forms a homogeneous two-phase gas-liquid fluid of the absorption fluid and the process gas. The fluid of the absorption liquid and the process gas enters through the inlet 152 through the inlet cone 153 to the second stage heat exchanger 154. The concurrent passage 210 of this fluid downward through the modules 34 of the heat exchanger 154 effects normal chilling of both phases to about 32° F. and absorption of residual organic contaminants and water vapor by the terpene liquid. The two-phase fluid exits the heat exchanger 154 through the bottom collector cone 158 and the drain 160. The drain 160 communicates with a conventional vane-impingement type mechanical liquid-gas separator 161 for physically separating 212 liquid and gas. Approximately 99 percent or more of the liquid terpene solution in the fluid is coalesced and collected in the automatic liquid float trap drain 166 and is purged through the coalescing-separator 164 to an atmospheric holding tank 168.

The partially cleaned process gas now contains small droplets of terpene mist. The process gas is communicated with the condensate to the coalescing-separator unit 164 where liquid mist is coalesced 214 and removed. The liquid is purged from the high pressure system through a liquid float trap 163 to the collector 168.

The process gas now contains only minute amounts of water vapor and hydrocarbons. The process gas exits the separator 164 through the discharger 170 and is communicated 216 to the input 110 of the intercooler 104. The intercooler preforms a final dehydration step 218 to remove the remaining water vapor and hydrocarbons.

The dried, cleaned process gas exits through the discharge 112 to dehydration-absorption beds (not illustrated). In a preferred embodiment, one bed is on-line and other beds are in a regeneration-standby mode, as is conventionally known. The bed in the regeneration-standby mode receive inert gas, such as nitrogen, to strip the water from the dehydration bed. For example, the dehydration beds may use carbon beads to remove extremely small contaminants and water vapor. The regeneration mode uses the heat of evaporation to strip the water from the carbon beads. Although not illustrated, inlet and exit valve manifolds are controlled by a timer-logic device or programmably controller. This dehydration step effects the removal of water to a dew point of about 70° F. The exit gas is essentially dry and cleaned of organic contaminants.

The present invention removes significantly high percentages of the contaminants in a process gas with significantly reduced volumes of solvent absorption fluids. The heat exchangers 116 and 154 use low flow rates of absorption fluid in a two-phase concurrent flow of process gas and absorption fluid with significantly high ratios of process gas to absorption liquid. The apparatus 100 and the process provides strict temperature control of the cooling of the process gas with high mass transfer and with controlled high turbulence of the process gas and the absorption fluid in the neat exchangers 116 and 154.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departure from the spirit of the invention as described by the following claims.

What is claimed is:

1. A method of removing organic contaminants from a process gas for purification thereof, comprising the steps of:
    (a) collecting a process gas having organic contaminants for removal;
    (b) injecting an absorption liquid into the process gas to form a two-state mixture of the absorption liquid and the process gas;
    (c) communicating the two-state absorption liquid and gas mixture concurrently through a heat exchange module for absorption of said organic contaminants in the process gas by the absorption liquid resulting in a cleaned process gas; and
    (d) separating the absorption liquid from the cleaned process gas, whereby the cleaned process gas, having said organic contaminants removed, is purified.

2. The method of claim 1, wherein the step (b) injects the absorption liquid at a ratio of about 1:10 to 1:100 absorption fluid to process gas by weight.

3. The method of claim 1, wherein the absorption liquid is a liquid terpene injected in step (b) as a mist into the process gas.

4. The method of claim 1, wherein step (c) comprises the steps of:
    (d) passing the two-state absorption liquid and process gas along a flow path defined by spaced-apart channels disposed transverse to the flow path in at least two heat exchange modules stacked together in a series; and
    communicating a refrigerant through the channels, the refrigerant in one heat exchange module flowing in a first direction and the refrigerant in the adjacent heat exchange module flowing in a second opposite direction, whereby the absorption liquid, being substantially cooled uniformly across the series of two heat exchange modules, absorbs said organic contaminants from the process gas.

5. The method of claim 4, further comprising the step of absorbing said organic contaminants by water vapor in the process gas prior step (b).

6. The method of claim 5, wherein the step of absorbing comprises communicating the process gas through a third heat exchange module.

7. The method of claim 6, wherein the step of communicating comprises the steps of:
    (d) passing the process gas along a flow path defined by spaced-apart channels disposed transverse to the flow path in a second set of at least two heat exchange modules stacked together;
    (f) communicating a second refrigerant through the channels, the second refrigerant in one heat exchange module flowing in a first direction and the refrigerant in the adjacent heat exchange module flowing in a second opposite direction, whereby the water vapor in the process gas, being substantially cooled across the series of two heat exchange modules, absorbs said organic contaminants from the process gas.

8. The method of claim 7, wherein the second refrigerant comprises the cleaned process gas.

9. The method as recited in claim 1, wherein the steps are performed as a continuous process.

10. A method of removing organic contaminants from a process gas for purification thereof, comprising the steps of:
    (a) collecting a process gas having organic contaminants for removal;
    (b) injecting a liquid terpene as a mist into the process gas at a rate of about 1:10 process gas to terpene liquid by weight to form a two-state mixture of the liquid terpene and process gas;
    (c) passing the two-state liquid terpene and process gas mixture along a flow path defined by spaced-apart channels disposed transverse to the flow path in at least two heat exchange modules stacked together in a series;
    (d) communicating a refrigerant through the channels, the refrigerant in one heat exchange module flowing in a first direction and the refrigerant in the adjacent heat exchange module flowing in a second opposite direction, whereby the liquid terpene, being substantially cooled uniformly across the series of two heat exchange modules, absorbs said organic contaminants from the process gas to result in a cleaned process gas; and
    (e) separating the liquid terpene from the cleaned process gas, whereby the cleaned process gas, having said organic contaminants removed, is purified.

11. The method as recited in claim 10, wherein the steps are performed as a continuous process.

* * * * *